US00RE39655E

(19) United States
(12) Reissued Patent
Verner et al.

(10) Patent Number: US RE39,655 E
(45) Date of Reissued Patent: May 29, 2007

(54) AIR DISTRIBUTOR ASSEMBLY AND PROCESS FOR AIR CONDITIONING A TEXTILE MACHINE USING A DISPLACEMENT TYPE AIR FLOW SYSTEM

(75) Inventors: Pavel Verner, Zürich (CH); Walter Bollier, Adliswil (CH)

(73) Assignee: Zellweger Luwa AG, Zurich (CH)

(21) Appl. No.: 08/977,915

(22) PCT Filed: Sep. 22, 1992

(86) PCT No.: PCT/CH92/00193

§ 371 (c)(1),
(2), (4) Date: Aug. 18, 1993

(87) PCT Pub. No.: WO93/06281

PCT Pub. Date: Apr. 1, 1993

Related U.S. Patent Documents

Reissue of:
(64) Patent No.: 5,472,018
Issued: Dec. 5, 1995
Appl. No.: 08/050,432
Filed: Aug. 18, 1993

(30) Foreign Application Priority Data

Sep. 23, 1991 (CH) ..... 02815/91

(51) Int. Cl.
*D01H 11/00* (2006.01)
F24F 3/00; F24F 1/00

(52) U.S. Cl. ..... 139/1 C

(58) Field of Classification Search ..... 239/555.3, 239/553.5; 34/20, 13, 154, 435; 57/308; 19/66 R, 19/66 C, 200; 15/301; 165/47, 53; 62/63, 62/322, 426; 454/187, 188; 139/1 C; 66/168
See application file for complete search history.

(56) References Cited

U.S. PATENT DOCUMENTS

| | | | | | |
|---|---|---|---|---|---|
| 2,460,150 | A | * | 1/1949 | Schupp | 34/20 X |
| 3,391,528 | A | * | 7/1968 | Shackelford | |
| 3,667,133 | A | * | 6/1972 | Lincoln | 34/20 |
| 3,744,724 | A | * | 7/1973 | Caille | 239/553.5 |
| 3,762,143 | A | * | 10/1973 | Stewart | 15/301 |
| 3,816,987 | A | * | 6/1974 | Hofstetter | 15/301 |
| 4,112,663 | A | * | 9/1978 | Chrtek | 57/308 |
| 4,196,544 | A | * | 4/1980 | Davis et al. | 165/47 X |
| 4,570,682 | A | * | 2/1986 | Bachmann | 139/1 C |
| 4,881,957 | A | * | 11/1989 | Shofner | 55/283 |
| 4,976,098 | A | * | 12/1990 | Meyer et al. | 57/308 |
| 5,121,522 | A | * | 6/1992 | Leinfeld et al. | 19/66 CC |
| 5,144,781 | A | * | 9/1992 | Fitzner | 454/187 |
| 5,157,910 | A | * | 10/1992 | Artzt et al. | 57/308 |
| 5,505,385 | A | * | 4/1996 | Gengler | 239/53.3 |

FOREIGN PATENT DOCUMENTS

| | | | | |
|---|---|---|---|---|
| DE | 2203900 | * | 7/1973 | |
| DE | 4123451 | * | 1/1993 | 57/308 |
| EP | 0137056 | * | 4/1985 | |
| FR | 1486241 | * | 7/1967 | |
| GB | 2131936 | * | 6/1984 | 62/63 |

OTHER PUBLICATIONS

Dr.–Ing. Helmut Weinsdorfer, Ulrich Stark Webmaschinenentstaubung und Webmaschinenklimatisierung–ein Widerspruch 6.Weberei—Kolloquium–Die Peripherie beeinfusst den Nutzeffekt—16.und 17. Oktober 1990.*

Helmut Weinsdorfer et al, Webmaschinenentstaubung und Webmaschinenklimatisierung–ein Widerspruch? 6. Weberei–Kolloquium—Die Peripherie beeinfusst den Nutzeffekt 16 and 17, Oct. 1990.*

Internatonales. Textil–Bulleting Weltausgabe Weberei No. 1, pp. 54–59 Geb. Sulzer A.G. Einzelklimatisierung an Sulzerwebmachinennen, 1973.*

* cited by examiner

*Primary Examiner*—Robert Muromoto
(74) *Attorney, Agent, or Firm*—Evans Evans P.A.

(57) ABSTRACT

A process for the air conditioning of a weaving machine includes generating, for the weaving machine, at least one conditioning air stream spaced from a warp of the weaving machine and directed towards the warp, and distributing the conditioning air stream in stages so as to form a downwardly directed displacement-type flow towards threads of the warp. The displacement-type flow is a non-turbulent, uniform flow over a cross-sectional profile of the flow.

23 Claims, 2 Drawing Sheets

AIR DISTRIBUTOR ASSEMBLY AND PROCESS FOR AIR CONDITIONING A TEXTILE MACHINE USING A DISPLACEMENT TYPE AIR FLOW SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a process for the air conditioning of a weaving machine, and more particularly to a device for the air conditioning a weaving machine.

2. Related Art

With the objective of reducing the interruptions of operation of powerful weaving machines, which interruptions result mainly from thread breakages, attempts have been made for a relatively long time to optimize the weaving conditions. Endeavours to achieve this objective just by influencing the space air conditioning of a weaving machine room result in a large volume flow of air, with a large power requirement per machine.

However, in connection with dust removal, processes are also known by which the climate directly at the weaving machine is influenced. In a known process of this type, conditioned air is supplied both via ceiling outlets distributed within the room and also through local outlets. In this case, for each machine a local outlet is provided, which exhibits a slot-shaped exit opening at a spacing above the warp. In another known process, the local outlets are disposed below the warps. In both cases, the exit opening extends approximately transversely to the warp over its full width and releases a jet of conditioned air, which jet is directed towards the warp.

In a report entitled "Weaving machine dust removal and air conditioning of a weaving machine—a conflict?" (Dr.-Ing. Helmut Weinsdörfer, Dipl.-Ing. Ulrich Stark), presented on the occasion of the 6th Weaving Industry Colloquium (16/17 October 1990) and published by the Institute for Textile and Process Technology, 7306 Denkendorf, Germany, an experimental arrangement is described which exhibits a local outlet of the above type, which outlet is directed vertically from above onto the back shed.

In the majority of cases, the air conditioning of the machine using local outlets brings, related to the frequency of thread breakage, a marked improvement as compared with applications in which an influence is exerted on the humidity conditions at the weaving machine only via the space air conditioning. In addition to this, there is also a considerably lower power requirement. However, in order to achieve satisfactory results it is still necessary to generate considerable volume flows of air, and as far as the operating costs are concerned the increased maintenance effort for the cleaning of the local outlets is also significant.

SUMMARY OF THE INVENTION

The object of the invention is to provide a process which brings an effective conditioning with a considerable reduction of the air conditioning costs per weaving machine by reduced power requirement and volume flow of air as well as lower water consumption, without creating an impermissible obstruction in visual terms or for accessibility.

In the present context, a piston-type displacement flow is understood as referring to a low-turbulence flow with a distribution which is approximately uniform over its full cross section and approximately equal velocity. In this case, exit velocities between 0.3 and 1.2 m/sec enter into consideration.

The invention is based on the finding that the transport of the moisture by an air jet blown out from a slot-shaped exit opening is of low effectiveness and is therefore uneconomical. What is responsible for this is mainly the relatively high exit velocity which is required for the throughput of the required quantity of air. Investigations demonstrate that in the first instance a considerable part of the conditioning air blown out does not reach the (still noninterwoven) warp threads. Subsequently, a part of this air rebounds at the warp, without being able to give off its humidity. This means that considerably more conditioned air must be conveyed than comes into action at the warp to achieve the relative humidity aimed at.

The displacement flow employed according to the invention permits a quite considerable reduction of the required exit velocity as compared with that from a slot-shaped exit opening, with an equal path to be traversed to reach the warp.

By virtue of the displacement flow which is in practice compact but which impinges on the warp at a low velocity, this flow does not rebound, but is mainly deflected. This deflection takes place gently and while preserving the piston-type nature, in order to flow away along the warp threads, mainly in the direction of the warp beam. This gives an optimal utilization of the conditioning air and it becomes possible to influence directly the humidity of the warp threads themselves, in order to condition these for the subsequent processing. With relatively small quantities of air and a low water requirement, optimal humidity is thus created directly at the warp, and the latter is kept to a high degree dust-free. Accordingly, the air conditioning costs may be considerably reduced.

As a result of the particular properties of the piston-type displacement flow, only a negligible quantity of surrounding air is set into motion by inductive means. Consequently, virtually no transport of such surrounding air in the direction of the warp is initiated. This is of importance in circumstances in which the relative humidity in the weaving room is considerably below the optimal values and can counteract the positive influence of the conditioning air at the warp.

The piston-type displacement flow permits the creation and maintenance, within its cross section, of conditions which are different from those of the surroundings. By designing the cross sectional shape and dimensions, it is accordingly possible to control the climate of each respective zones at a textile machine with respect to required properties. The entry of entrained matter and dust from the surroundings into this zone is likewise prevented. If this is required, it is accordingly also possible to control at a machine or within the delivery region of the textile material, a plurality of zones, by a respective piston-type displacement flow; in this case, the climatic conditions in these zones can be designed to be different. Accordingly, piston-type displacement flows may be employed with advantage also 10 for the air conditioning of other textile procedures and processes such as for example in carding, in depositing, storage and take-up of the slubbing from the can, in stretching and spinning, as well as in twisting.

The experience gained in the application of the process according to the invention as well as in the operation of the device which is likewise according to the invention has shown that the avoidance of the circulation of surrounding air also has a beneficial effect in the sense of the reduction of the maintenance expenditure, especially with regard to cleaning in the region of the local outlets.

BRIEF DESCRIPTION OF THE DRAWINGS

The process according to the invention and the device according to the invention are explained in greater detail hereinbelow with reference to an illustrative embodiment relating to the air conditioning of a weaving machine as well as with reference to the drawing. In the drawing.

DETAILED DESCRIPTION OF THE PRESENTLY PREFERRED EXEMPLARY EMBODIMENT

Figure 1:
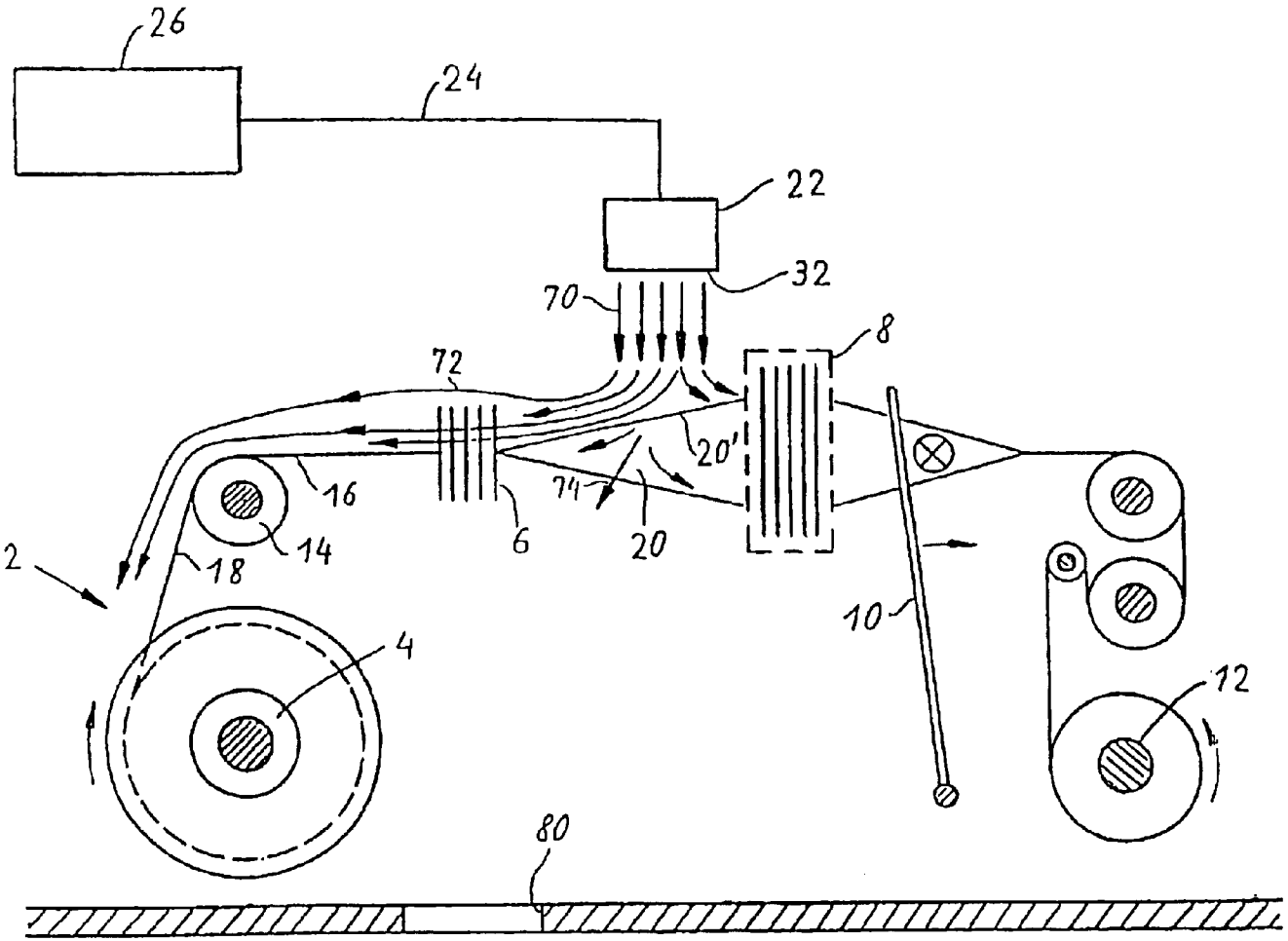
FIG. 1 diagrammatically shows the conditions at a weaving machine equipped with a device according to the invention, in the application of an embodiment of the process.

In FIG. 1, reference numeral 2 generally designates a weaving machine having a warp beam 4, thread stop motions 6, a heald frame assembly 8, a slay 10, and a cloth beam 12. The warp threads which pass over a backrest 14 and which form the warp 16 are designated by 18 and the back shed of the shed adjoining the thread stop motions 6 is indicated at 20.

In the illustrative embodiment shown, a local outlet 22 is disposed above the weaving machine 2 and at a spacing from the warp 16 or the back shed 20, which local outlet is supplied with conditioned air via a line 24 from an air conditioning plant 26. The local outlets of all further weaving machines of the weaving room (not shown) are also connected to the same air conditioning plant 26. The local outlet 22 possesses an exit opening 32 directed downwards towards the warp 16 and extends horizontally over the entire working width of the weaving machine 2; in this case, the exit opening is directed approximately at right angles to the general extent of the warp. The design of the local outlet is evident from FIGS. 2 and 3.

Figure 2:
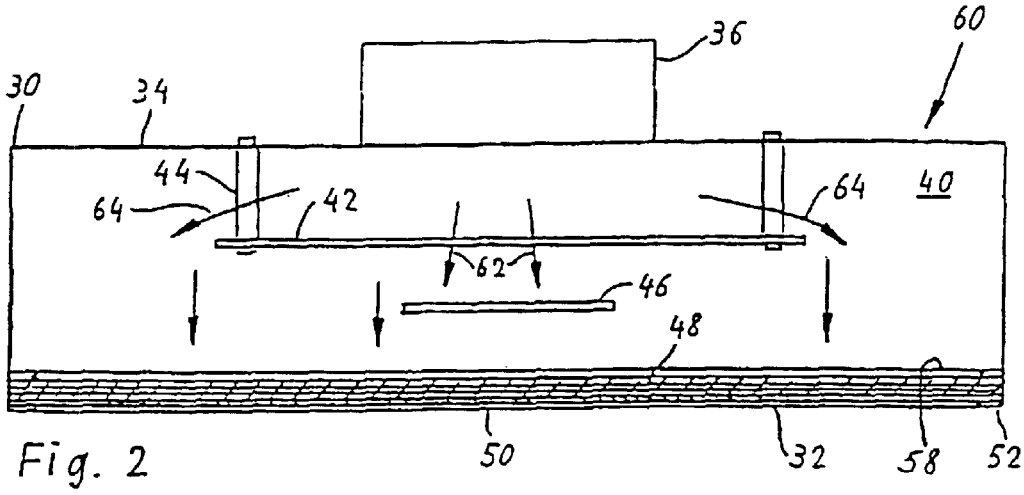
FIG. 2 shows a vertical cross section along line II—II in FIG. 3, through the local outlet of the device according to FIG. 1, which local outlet is shown on an enlarged scale.
Figure 3:
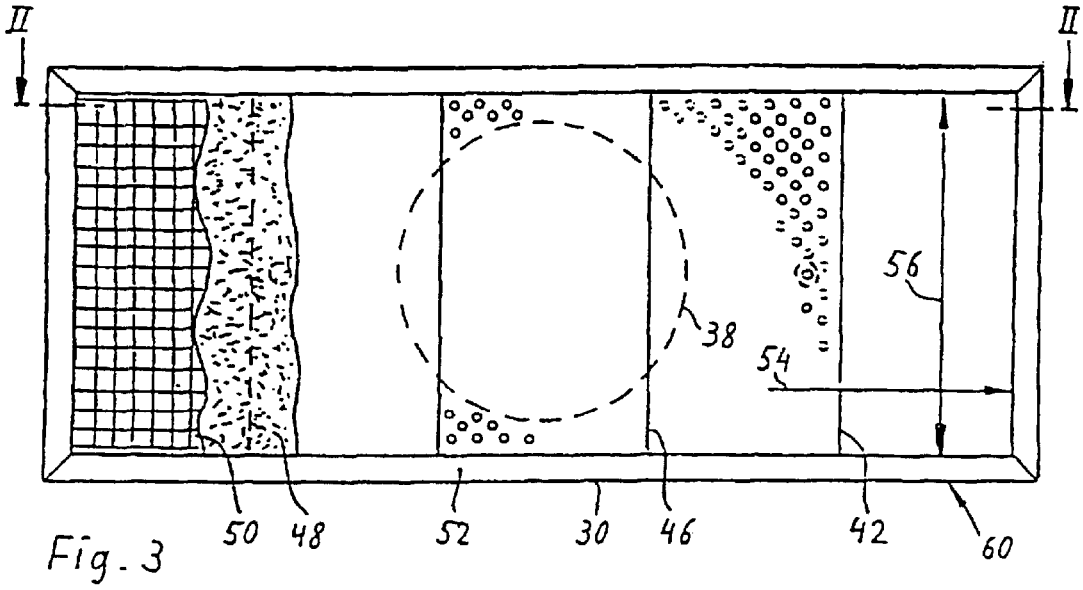
FIG. 3 shows a bottom plan view of the local outlet according to FIGS. 1 and 2, partly broken away.

As may be inferred from the cross sectional representation of FIG. 2, the local outlet 22 comprises a box 30 of elongate form with uniform rectangular cross section over its longitudinal extent. The box 30 is closed on all sides with the exception of the bottom surface forming the exit opening 32. At the top surface 34 of the box 30 there is provided, approximately at the longitudinal center thereof, a cylindrical connecting piece 36 for connection with the line 24, which connecting piece is connected with the inner space 40 of the box via a circular inlet opening 38 (shown in broken lines in FIG. 3) of the same internal cross section. The bottom surface and the top surface represent the long sides of the rectangular cross sectional shape of the box.

The inner space 40 contains distribution components to distribute uniformly the air flowing in through the inlet opening 38 over the surface of the exit opening 32 and to generate the displacement flow which is provided according to the invention. These distribution components comprise, seen in the direction of flow, a perforated sheet 42 which extends parallel to the top surface 34, but at a spacing from the latter, over a central longitudinal region and the full width of the inner space 40. Thus, the distribution components are stacked in spaced relation in the direction of air flow. The length of the perforated sheet 42 secured by means of bolts 44 to the top surface 34 of the box 30 is greater than the diameter of the inlet opening 38, but smaller than the length of the inner space. Below the perforated sheet 42 there extends, likewise parallel to the top surface 34 over the full width of the inner space 40, a further perforated sheet 46, which is secured to the side walls of the box 30 or is supported in an appropriate manner on the bottom surface. In the longitudinal direction of the inner space 40 the extent of this perforated sheet 46 is restricted to an amount which is somewhat smaller than the diameter of the inlet opening 38. The passage cross section formed by the performing of the perforated sheets 42 and 46 accounts for preferably between 35 and 45%, related to the surface area thereof.

There finally follows, as the last distribution component in the inner space 40 of the box, an air-permeable mat 48, for example of an appropriate foam material, which mat is clamped between a peripheral flange 58 of the box and a grid 50. Mat 48 and grid 50 extend over the full length and width of the inner space. The grid 50, which is formed, for example, by a wire grid of relatively large mesh width, is supported on a narrow frame 52, which is provided at the bottom surface of the box. The frame 52 limits the exit opening 32 by the length 54 and the width 56. Preferably, the mat 48 is fitted in the box for example by demountability of the frame 52, so that its accessibility for the purpose of exchange is possible at any time. A foam material with a pressure loss of 15–20 Pa at 0.6 m/sec has proved to be suitable for the mat 48.

Together with the distribution components 42, 46 and 48, the box 30 represents an air distributor 60. The described design and arrangement of the distribution components in this box give a distribution of the air in stages flowing in through the inlet opening 38 into the inner space 40. As a result of the perforated sheet 42, which, also acting as baffle plate, lies opposite the inlet opening, only a part of this air can pass through in the direction of the arrows 62, while the remainder is deflected to opposite sides in the longitudinal direction of the inner space 40 with low pressure loss, without having to overcome an impediment to flow on the further path to the mat 48, i.e. in the direction of the arrows 64. In order to reduce the velocity in the partial stream flowing without deflection in the direction of the arrows 62, this partial stream must still overcome the perforated sheet 46. The partial streams 62 and 64 thus arrive at approximately the same velocity at the mat 48. Besides a further balancing, a fine distribution of the air takes place at the mat 48 and upon passing through the latter a piston-type displacement flow formed of the finest stream lines is created. For the outlet velocity, in the present context a restriction to values of between 0.5 and 0.8 m/sec is appropriate. Thus, the quantities of air may be designed to be different, within certain limits, even in the case of the same dimensions of the air distributor 60.

In operation, the air conditioning plant delivers conditioned air, which emerges from the local outlet 22 (FIG. 1) formed by the air distributor 60, as a piston-type displacement flow 70, e.g. with an outlet velocity of 0.6 m/sec vertically downwards and in this case exhibits a width of for example 300 mm, depending upon the dimension 56. The displacement flow traverses the distance, amounting for example to 0.9 m, to the upper group of warp threads 20' of the shed 20 in compact form, and impinges on said group upstream of the heald frame assembly 8. Upon impinging on said group as well as on the lower group of warp threads 20", the air is deflected at least as the major partial stream 72 towards the thread stop motions 6 and flows along the warp threads 18 counter to their direction of delivery. A partial stream 74 flows in the shed region along the corresponding warp threads and flows away downwards between these. In this case, both partial streams of this air create in the environment of the warp 16 a climate which is suitable for the transport and the processing, in that heat and dust are conducted away and the relative humidity is kept at an advantageous value. Since the warp threads 18 are circumcirculated by the stream over a relatively long period of time, a direct moisture takeup also takes place, which has a favorable effect both for the weaving process and also for the water consumption. In particular, this applies to the influence of the partial stream 72, which flows along the warp threads, envelops these and screens them off in relation to the surrounding air.

A spacing of approximately 1.2 m of the local outlet from the warp running therebelow represents an upper limit on economical grounds.

It should be added that below the weaving machine 2, expediently in a manner known per se, a floor opening 80 is provided, via which dust-laden air is transported away.

It has proved to be the case that the arrangement of the local outlet 22 so that the displacement flow 70 impinges on the upper group of warp threads 20' at an acute angle greatly favors the deflection of the same or the formation of a relatively large partial stream 72 and an orientation of the same parallel to the warp threads. Since an effective conditioning of the warp threads 18 can be achieved only over a sufficiently long period of action, this partial stream acts as its own conditioning medium. With the objective of a long period of action of the air streams 70 and 72 respectively, the arrangement of the air outlet 22 so that the stream 70 impinges on the warp 16 or the back shed 20 directly behind the heald frame assembly 8 is advantageous. On the other hand, in the case of such an arrangement an air build-up takes place at that side of the heald frame assembly which faces the back shed 20, which air build-up assists the deflection of the partial stream 72.

Where the conditioning is also to take place in the region of the front shed or of the gate for the weft thread spools, according to the invention additional outlets similar to the local outlet 22 are to be provided for this purpose, which additional outlets are supplied from the air conditioning plant 26. Just like the local outlet 22, these outlets are also to be provided in the form of elements separate from the weaving machine.

We claim:

1. A process for the air conditioning of a weaving machine, comprising the steps of:

generating, for the weaving machine, at least one conditioning air stream spaced from a warp of the weaving machine and directed towards the warp, and distributing the conditioning air stream in stages so as to form a downwardly directed displacement-type flow towards threads of the warp, said displacement-type flow being a non-turbulent, uniform flow over a cross-sectional profile of the flow.

2. The process as claimed in claim 1, further comprising the step of conditioning the warp threads by a partial stream of the displacement flow, the partial stream flowing along the warp threads.

3. The process as claimed in claim 1, further comprising the step of deflecting the displacement flow directed onto a back shed of the weaving machine and then guiding the displacement flow along the warp threads in a direction of a side of a warp beam of the weaving machine.

4. The process as claimed in one of claims 1, 2 or 3, wherein a maximum outlet velocity of 0.9 m/sec is imparted to the displacement flow.

5. A device for air conditioning a weaving machine comprising:

at least one local air outlet for the weaving machine, said outlet being cooperable with an inlet opening to an air conditioning plant and being constructed and arranged to generate an air stream directed downwards into a region of a warp of the weaving machine, wherein an outlet opening of the air outlet is constructed and arranged to extend transversely to the warp and to be spaced from the warp, an air distributor being connected upstream of the outlet opening, said air distributor including a plurality of flat distribution components stacked in a spaced relation in the direction of air flow, said flat distribution components being constructed and arranged to distribute air between the inlet opening and the outlet opening, and wherein the outlet opening exhibits a width of at least 150 [min] *mm*.

6. The device as claimed in claim 5, wherein the outlet opening of the air outlet is provided at a long side of a box, which forms the air distributor and which is approximately rectangular in profile and having a cross section which approximately corresponds to the cross section of the outlet opening.

7. The device as claimed in claim 5 or 6, wherein the distribution components comprise an air-permeable mat and a perforated sheet, and wherein a further distribution component disposed opposite the inlet opening is provided as a baffle component in the air distributor.

8. The device as claimed in claim 7, wherein the perforated sheet is disposed, in a direction of flow, upstream of the mat and parallel thereto and to the outlet opening and a surface extent of the mat is approximately the same as the cross section of the outlet opening.

9. The device as claimed in claim 5 or 6, wherein the air distributor includes at least one lateral outlet opening.

10. An arrangement for air conditioning a textile machine, comprising:

a weaving machine, a local flow outlet disposed above the weaving machine and in flow communication therewith, said outlet being constructed and arranged to produce an air flow stream having a uniform distribution in stages over a cross sectional profile of the flow such that a flow velocity is constant over said cross sectional profile and said outlet having an elongated exit opening.

11. The arrangement according to claim 10, wherein said exit opening extends substantially along an entire working length of the weaving machine.

12. A device for air conditioning a weaving machine comprising:

at least one local air outlet for the weaving machine, said outlet being connected via an inlet opening to an air conditioning plant and being constructed and arranged to generate an air stream directed downwards into a region of a warp of the weaving machine, wherein an outlet opening of the air outlet is constructed and arranged to extend transversely to the warp and to be spaced from the warp, an air distributor being connected upstream of the outlet opening, said air distributor including a plurality of flat distribution components connected in series in the direction of air flow, and wherein the outlet opening exhibits a width of at least 150 mm, and wherein the outlet opening of the air outlet is provided at a long side of a box, which forms the air distributor and which is approximately rectangular in profile and having a cross section which approximately corresponds to the cross section of the outlet opening.

13. The device as claimed in claim 12, wherein the distribution components comprise an air-permeable mat and a perforated sheet, and wherein a further distribution component disposed opposite the inlet opening is provided as a baffle component in the air distributor.

14. The device as claimed in claim 13, wherein the perforated sheet is disposed, in a direction of flow, upstream of the mat and parallel thereto and to the outlet opening and a surface extent of the mat is approximately the same as the cross section of the outlet opening.

15. The device as claimed in 12, wherein the air distributor includes at least one lateral outlet opening.

16. A process for the air conditioning of a weaving machine, comprising the steps of:

generating, for the weaving machine, at least one conditioning air stream spaced from a warp of the weaving machine and directed towards the warp, distributing the conditioning air stream so as to form a downwardly directed piston-type displacement flow towards threads of the warp, and deflecting the displacement flow directed onto a back shed of the weaving machine and then guiding the displacement flow along the warp threads in a direction of a side of a warp beam of the weaving machine.

17. A process for the air conditioning of a weaving machine, comprising the steps of:

generating, for the weaving machine, at least one conditioning air stream spaced from a warp of the weaving machine and directed towards the warp, and distributing the conditioning air stream so as to form a downwardly directed piston-type displacement flow towards threads of the warp, wherein a maximum outlet velocity of 0.9 mm/sec is imparted to the displacement flow.

18. A process for the air conditioning of a weaving machine, comprising the steps of:

generating, for the weaving machine, at least one conditioning air stream spaced from a warp of the weaving machine and directed towards the warp, distributing the conditioning air stream so as to form a downwardly directed piston-type displacement flow towards threads of the warp, and conditioning the warp threads by a partial stream of the displacement flow, the partial stream flowing along the warp threads, wherein a maximum outlet velocity of 0.9 mm/sec is imparted to the displacement flow.

19. A process for the air conditioning of a weaving machine, comprising the steps of:

generating, for the weaving machine, at least one conditioning air stream spaced from a warp of the weaving machine and directed towards the warp, distributing the conditioning air stream so as to form a downwardly directed piston-type displacement flow towards threads of the warp, and deflecting the displacement flow directed onto a back shed of the weaving machine and then guiding the displacement flow along the warp threads in a direction of a side of a warp beam of the weaving machine, wherein a maximum outlet velocity of 0.9 mm/sec is imparted to the displacement flow.

*20. A process for air conditioning a textile machine, comprising the steps of:*

*(a) generating a conditioning air stream in an area proximate the textile machine; and*

*(b) distributing the conditioning air stream towards the textile machine in stages so as to form a downwardly directed displacement-type flow towards threads in the textile machine, the displacement-type flow being a non-turbulent, uniform flow over a cross-sectional profile of the flow.*

*21. A process for air conditioning a textile machine, comprising the steps of:*

*(a) generating a conditioning air stream;*

*(b) directing the conditioning air stream to an air distributor assembly including a plurality of spaced-apart, air distribution components;*

*(c) moving the conditioning air stream through the air distributor assembly in stages defined by the air distribution components so as to form a downwardly directed displacement-type flow towards threads in the textile machine, the displacement-type flow being a non-turbulent, uniform flow over a cross-sectional profile of the flow; and*

*(d) distributing the displacement-type flow outwardly from the air distributor assembly towards the textile machine.*

*22. An air distributor assembly for air conditioning a textile machine, comprising:*

*(a) an air inlet adapted for communicating with a source of conditioning air flow;*

*(b) a first air distribution component downstream of said inlet for slowing the flow of conditioned air through said distributor assembly;*

*(c) a second air distribution component spaced-apart from said first air distribution component and defining an air outlet downstream of said inlet to further slow the flow of conditioned air outwardly through said distributor assembly and in a direction of the textile machine; and*

*(d) wherein said first and second air distribution components cooperate to distribute the conditioned air flow to the textile machine in stages so as to form a downwardly directed displacement-type flow towards threads in the textile machine, said displacement-type flow being a non-turbulent, uniform flow over a cross-sectional profile of the flow.*

*23. In combination with a textile machine, the improvement comprising an air distributor assembly for air conditioning the textile machine, the air distributor assembly comprising:*

*(a) an air inlet adapted for communicating with a source of conditioning air flow;*

*(b) a first air distribution component downstream of said inlet for slowing the flow of conditioned air through said distributor assembly;*

*(c) a second air distribution component spaced-apart from said first air distribution component and defining an air outlet downstream of said inlet to further slow the flow of conditioned air outwardly through said distributor assembly and in a direction of the textile machine; and*

*(d) wherein said first and second air distribution components cooperate to distribute the conditioned air flow to the textile machine in stages so as to form a downwardly directed displacement-type flow towards threads in the textile machine, said displacement-type flow being a non-turbulent, uniform flow over a cross-sectional profile of the flow.*

* * * * *

UNITED STATES PATENT AND TRADEMARK OFFICE

CERTIFICATE OF CORRECTION

PATENT NO. : RE 39, 655 E
APPLICATION NO. : 08/977915
DATED : May 29, 2007
INVENTOR(S) : Verner et al.

It is certified that error appears in the above-identified patent and that said Letters Patent is hereby corrected as shown below:

Column 6, line 18, delete "[min]".

Signed and Sealed this

Thirty-first Day of July, 2007

JON W. DUDAS
*Director of the United States Patent and Trademark Office*